March 19, 1946.
E. A. GLYNN
2,396,781
DRIVE MECHANISM FOR TIRE MOLDS
Original Filed March 22, 1943
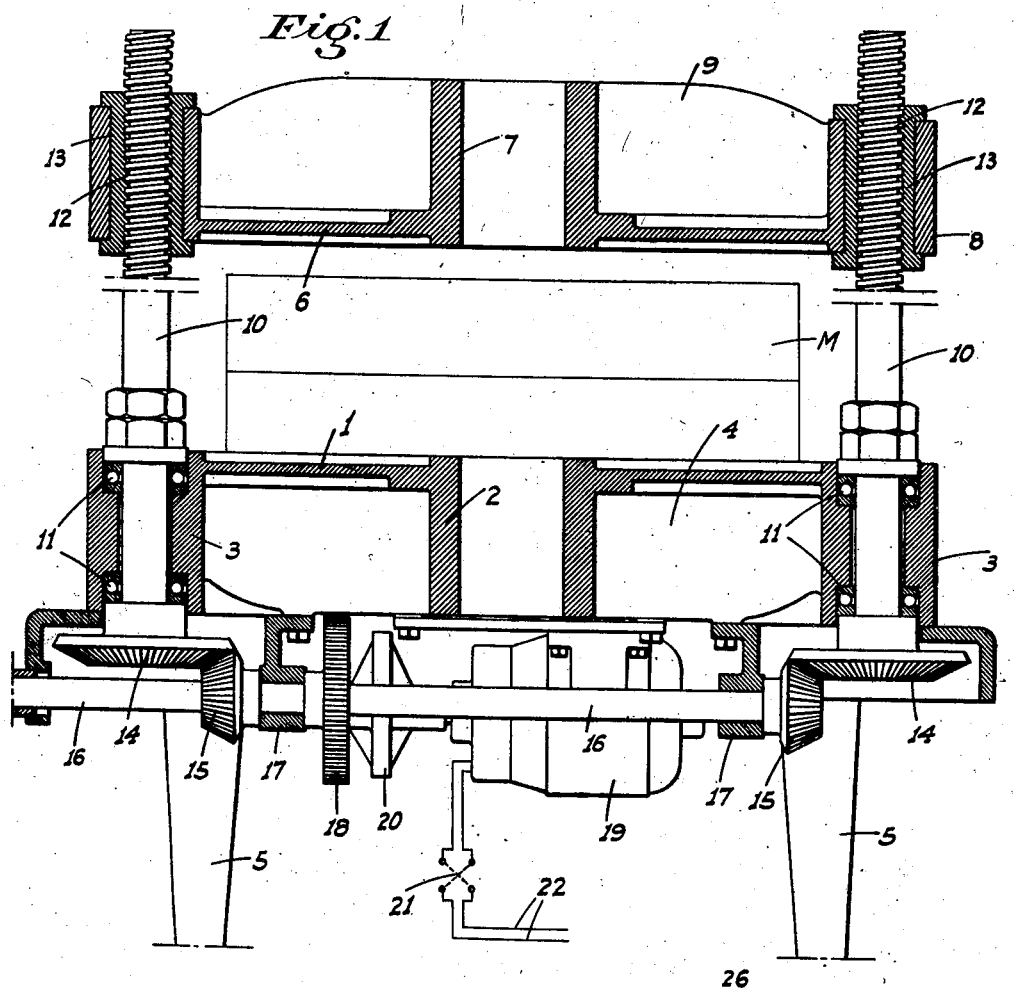
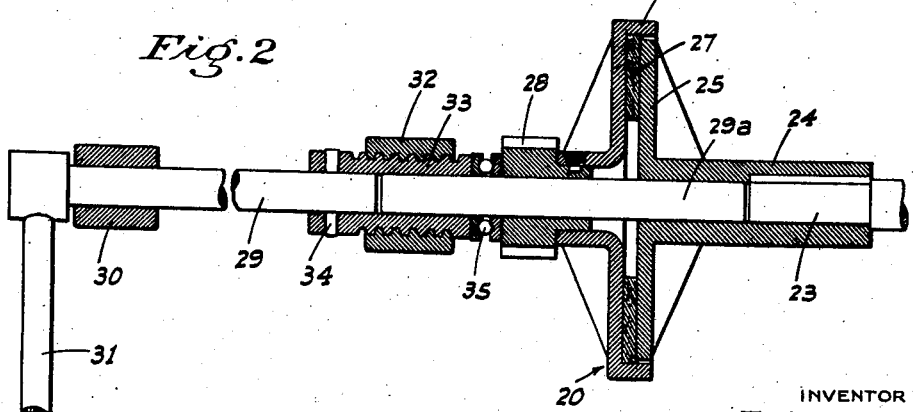
INVENTOR
E. A. Glynn
BY
ATTORNEYS Patented Mar. 19, 1946

2,396,781

UNITED STATES PATENT OFFICE 2,396,781

DRIVE MECHANISM FOR TIRE MOLDS

Edwin A. Glynn, Lodi, Calif., assignor to Super Mold Corporation of California, Lodi, Calif., a corporation of California Original application March 22, 1943, Serial No. 479,999. Divided and this application October 13, 1944, Serial No. 558,569

3 Claims. (Cl. 192—20)

This invention relates to, and it is an object to provide, an improved drive mechanism for relatively movable parts of a tire repair or tread vulcanizing mold; such mechanism including a novel clutch unit.

The present application is a division of application, Serial No. 479,999 filed March 22, 1943, on an invention entitled Interchangeable matrix tread mold.

Another object of the invention is to provide a drive mechanism, as above, especially adapted for use in operative connection with a tread vulcanizing mold which includes a bed plate and a head plate mounted in facing relation to each other and for relative axial movement whereby to forcefully but removably engage an initially separate, tire receiving matrix assembly between said plates; the drive mechanism being manually controlled and arranged to cause powered movement of said plates toward or away from each other.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a sectional elevation of a tread vulcanizing mold embodying the present invention.

Figure 2 is a fragmentary sectional elevation, enlarged, of the clutch unit which is included in the drive mechanism.

Referring now more particularly to the characters of reference on the drawing, the improved drive mechanism is here shown as incorporated in a tread vulcanizing mold which comprises a circular horizontal bed plate 1 which includes, in integral relation, a central hub 2 and a depending peripheral flange 3. Circumferentially spaced strengthening webs 4 extend radially between the hub 2 and the flange 3. The bed plate is supported some distance above the floor by legs 5.

A matching head plate 6 is disposed in adjacent but spaced relation above the bed plate and in axial alinement with the latter; adjacent faces of the plates 1 and 6 being parallel. The head plate 6 likewise includes a hub 7, an upstanding peripheral flange 8, and strengthening webs 9 extending therebetween.

The head plate 6 is supported above the bed plate 1 for axial movement by means of a pair of vertical spindles 10 which are disposed in diametrally opposed relation; such spindles being rotatably but axially immovably journaled in connection with the bed plate adjacent the periphery thereof by bearings indicated generally at 11. These spindles 10 project vertically some distance above the bed plate 1 and threadingly engage, as at 12, in vertical sleeves 13 fixed in the head plate 6 adjacent its periphery and at diametrally opposed points therein. By simultaneous rotation of the spindles 10 in one direction or the other, the head plate 6 is either lowered or raised relative to the bed plate for the purpose of clamping a tire tread vulcanizing matrix M therebetween, or releasing said matrix for removal, respectively. Simultaneous rotation of the spindles 10 is accomplished through the medium of the drive mechanism which is the subject of the present invention, and which mechanism comprises the following:

A bevel gear 14 is secured on the lower end of each spindle below the bed plate 1 and said bevel gears are driven by pinions 15 fixed on a horizontal shaft 16 journaled beneath said bed plate on depending brackets 17. A spur gear 18 is fixed on shaft 16 and is driven, at reduced speed, from a motor 19 mounted on and depending from the bed plate; the axis of said motor 19 being parallel to the shaft 16. A clutch unit, indicated generally at 20, is interposed between the gear 18 and the motor 19. The motor 19 is of reversible type and is controlled by means of a manually actuated reversing switch 21 interposed in the current supply cable 22 for said motor.

The clutch unit 20, which is shown in detail in Fig. 2, comprises the following:

The drive shaft 23 of motor 19 extends axially into and is keyed to an elongated hub 24 of a radial clutch disc 25 formed integral with said hub. The other disc or element of the clutch is formed as a hollow cup 26 having a clutch lining 27 of friction material therein; the clutch disc 25 seating in said cup 26. The cup 26 has a pinion 28 rigidly mounted in axial connection therewith, said pinion meshing in driving relation with the gear 18.

As will be apparent, limited axial movement of the cup 26 in the direction of the disc 25 will result in coupling of the clutch and rotation of the pinion 28 from the motor shaft 23. Conversely, movement of the cup in an opposite direction will uncouple the clutch. Such limited movement of the cup 26 is accomplished through the medium of a control shaft 29 which extends below the bed plate 1 from a point beyond the periphery of the latter, said shaft 29 being rotatably supported adjacent its outer end by a bracket 30. A radial hand lever 31 is fixed on shaft 29 beyond the bracket 30 for manual rotation of said shaft 29. Intermediate the pinion 28 and bracket 30 the shaft 29 terminates adjacent a fixed collar 32 which is tapped from end to end. A threaded bushing 33 is pinned to shaft 29, as at 34, and is threaded through the fixed collar 32. Shafts 29 and 23 are held in alinement and the pinion and clutch cup unit are supported by a floating shaft 29a seated at its ends in hub 24 and bushing 33 and extending axially through the pinion 28 and cup member 26. By means of this construction, driving of shaft 23 normally does not tend to rotate shaft 29. A thrust bearing unit 35 freely surrounds shaft 29a and is engaged between adjacent ends of pinion 28 and collar 32. As will be obvious, swinging movement of the lever 31 causes the threaded bushing 33 to be shifted in a direction either toward or away from the pinion 28 and this movement is imparted to said pinion and cup 26, resulting either in engagement or disengagement of the clutch. When the motor is running in one direction or the other engagement of the clutch causes lowering or raising of the head plate to clampingly engage, or to release, respectively, the matrix M.

From the foregoing description it will be readily seen that I have produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described my invention, what I claim as new and useful and desire to secure by Letters Patent is:

1. A manually controlled drive mechanism comprising a driven shaft, another shaft disposed in axial alinement with said driven shaft and mounted for rotation and limited axial movement, a clutch including a pair of co-operating clutch elements, one element being fixed on the driven shaft and the other element being mounted for rotation relative thereto, a pinion fixed axially on said other clutch element, a gear driven by said pinion, and hand control means including said other shaft operative to shift said pinion axially to engage the clutch elements, such control means comprising a threaded bushing fixed on said other shaft in axially alined, adjacent but spaced relation to the pinion, a fixed collar into which said bushing is threaded, an annular bearing unit engaged between the bushing and pinion, and an exposed radial hand lever secured on said other shaft.

2. A manually controlled drive mechanism comprising a driven shaft, a clutch element mounted in driving relation with said driven shaft, an interiorly threaded fixed collar supported in spaced relation with respect to said clutch element, a bushing threaded through the collar, a hand operated means for turning the bushing to advance or retract it through the collar, a floating shaft journaled in the bushing and in the clutch element, a gear mounted on the floating shaft between the bushing and the clutch element, a second clutch element on the gear engageable with the first clutch element to place the driven shaft into driving connection with the gear, the bushing, when advanced through the collar, engaging the gear and advancing it along said floating shaft to bring the two clutch elements into engagement with each other.

3. A device as in claim 2 and including antifriction bearings slidable on the floating shaft and interposed between the bushing and gear.

EDWIN A. GLYNN.